(12) United States Patent
Dhaussy et al.

(10) Patent No.: US 10,155,440 B2
(45) Date of Patent: Dec. 18, 2018

(54) TANK WITH VENTILATION CANAL COMPRISING COVER

(71) Applicant: PLASTIC OMNIUM ADVANCED INNOVATION AND RESEARCH, Brussels (BE)

(72) Inventors: Franck Dhaussy, Margny-les-Compiegne (FR); Gwereg Paolini, Le Plessis Brion (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 49 days.

(21) Appl. No.: 14/683,597

(22) Filed: Apr. 10, 2015

(65) Prior Publication Data

US 2015/0291025 A1    Oct. 15, 2015

(30) Foreign Application Priority Data

Apr. 10, 2014 (FR) ..................... 14 53189

(51) Int. Cl.
| | |
|---|---|
| *B60K 15/035* | (2006.01) |
| *B60K 15/05* | (2006.01) |
| *B60K 15/03* | (2006.01) |
| *B60K 15/04* | (2006.01) |

(52) U.S. Cl.
CPC ........ *B60K 15/05* (2013.01); *B60K 15/03177* (2013.01); *B60K 2015/03032* (2013.01); *B60K 2015/0346* (2013.01); *B60K 2015/03309* (2013.01); *B60K 2015/03368* (2013.01); *B60K 2015/03542* (2013.01); *B60K 2015/047* (2013.01)

(58) Field of Classification Search
CPC ................ B60K 15/035; B60K 15/077; B60K 2015/03368; B60K 2015/03557

USPC ........ 220/745–749, 86.1, 501; 123/59, 41.27
See application file for complete search history.

(56) References Cited

U.S. PATENT DOCUMENTS

| | | | | |
|---|---|---|---|---|
| 3,804,291 A | * | 4/1974 | Fricker ............ | B60K 15/03504 220/501 |
| 4,298,130 A | * | 11/1981 | Ifrach ................ | B60K 15/0403 137/571 |
| 4,334,410 A | * | 6/1982 | Drumare ............... | F17C 13/021 137/392 |
| 4,531,653 A | * | 7/1985 | Sakata ............. | B60K 15/03504 137/38 |

(Continued)

FOREIGN PATENT DOCUMENTS

DE    20 2012 012 347 U1    2/2013

OTHER PUBLICATIONS

French Preliminary Search Report dated Dec. 3, 2014 in French Application 14 53189, filed on Apr. 10, 2014 (with English Translation of Categories of Cited Documents).

*Primary Examiner* — Shawn M Braden
(74) *Attorney, Agent, or Firm* — Oblon, McClelland, Maier & Neustadt, L.L.P.

(57) ABSTRACT

The invention relates to a tank (1) for storing a liquid, comprising a wall (10) made of plastic and a device for stopping the filling of said tank (1) with a liquid at a maximum fill level, this device extending inside the tank (1) and comprising at least one opening (71) of which the position inside the tank (1) fixes the said maximum fill level. The device that stops the filling of this tank (1) comprises a first part formed with the wall (10) and a second part which is fixed hermetically to the first part.

16 Claims, 2 Drawing Sheets

(56) References Cited

U.S. PATENT DOCUMENTS

| | | | |
|---|---|---|---|
| 5,186,352 A * | 2/1993 | Otto | B60K 15/03177 |
| | | | 220/501 |
| 6,145,532 A * | 11/2000 | Tuckey | B60K 15/03519 |
| | | | 137/202 |
| 6,213,170 B1 | 4/2001 | Burke et al. | |
| 9,016,513 B2 * | 4/2015 | Kulack | B65D 25/02 |
| | | | 220/731 |
| 9,186,982 B2 * | 11/2015 | Baldwin | B60K 15/035 |
| 2003/0098063 A1 | 5/2003 | Mori et al. | |
| 2008/0223865 A1 * | 9/2008 | Althof | B60K 15/03504 |
| | | | 220/746 |
| 2012/0318512 A1 * | 12/2012 | Gould | E21B 43/24 |
| | | | 166/302 |
| 2015/0203343 A1 * | 7/2015 | Cazaux | B64D 37/005 |
| | | | 141/198 |

* cited by examiner

TANK WITH VENTILATION CANAL COMPRISING COVER

The present invention relates to a tank for storing a liquid.

A tank for storing fuel, or a liquid agent (such as urea) intended to be injected into the exhaust gases of a vehicle internal combustion engine, comprises a filling port, also referred to as a filling orifice, via which the tank is supplied with liquid, and a ventilation port which allows the air and liquid vapours present in the tank to escape while the tank is being filled. Each of these ports is situated at the end of a duct, generally in the form of a tube, which passes through the wall of the tank and comprises an internal part extending into the tank down to a certain height, and an external part extending outside of the tank. The external part of each of these ducts is connected to a pipe. Thus, the filling port is situated at the internal end of a filling duct which extends down to a certain height inside the tank and the external end of which is connected on the outside of the tank to a filling pipe, and the ventilation port is situated at the internal end of a ventilation duct which extends down to a height $H_V$ inside the tank and the external end of which is connected on the outside of the tank to a ventilation pipe. These heights are measured with respect to an arbitrary reference in a vertical direction and in the normal position of use of the tank.

The maximum volume with which the tank can be filled is determined by the height $H_V$ of the ventilation port. This is because when the liquid, which passes along the filling duct in order to fill the tank, reaches the ventilation port, the liquid can no longer rise inside the tank and begins to rise up in the filling duct and the filling pipe rapidly under the effect of the pressure of the gases trapped in the tank, until it reaches the nozzle dispensing the liquid. The smaller the height $H_V$ of the ventilation port, the sooner the nozzle is reached by the liquid when the tank is being filled, and therefore the lower the maximum level to which the tank can be filled. It will therefore be appreciated that the smaller the height $H_V$ of the ventilation port inside the tank, the smaller will be the maximum volume with which the tank can be filled.

The ventilation duct is therefore a device that stops the filling of the tank.

The desired maximum fill volume of the tank varies according to various criteria. These criteria include, for example, the nature of this liquid, and the equipment present inside the tank.

Those parts of the ducts which are situated inside the tank are moulded directly with the rest of the tank. This solution has the disadvantage that the shaping of the mould and the demoulding of these ducts, and therefore of the tank, are more complicated. Manufacture of the tank is therefore fairly lengthy and costly.

The present invention seeks to overcome these disadvantages.

The invention seeks to propose a tank, the maximum fill level of which can be chosen with ease, and the cost of manufacture of which is as low as possible.

This object is achieved by virtue of the fact that the tank comprises a wall made of plastic and a device for stopping the filling of this tank with a liquid at a maximum fill level, the device extending inside the tank and comprising at least one opening of which the position inside the tank fixes this maximum fill level, the fill-stop device comprising a first part formed with the wall and a second part which is fixed hermetically to the first part.

By virtue of these arrangements, the fill-stop device is formed in a simple way by fixing a second part to a first part already present on the wall and which is easily formed simultaneously with the wall. The injection of an entire duct in the form of a tube (or some other shape) with the wall in order to form the ventilation duct that fixes the maximum fill level of the tank is avoided and the complex operation of demoulding such a duct is avoided. This therefore makes the tank easier to manufacture.

For example, the first part comprises reliefs moulded on the internal face of the wall, and the second part comprises a cover which is fixed hermetically to the reliefs.

Advantageously, the opening is formed by the cover and by the reliefs.

Thus, the shape and/or dimensions of the cover makes it possible to set the position of the opening and therefore the maximum fill level of the tank.

For two identical tanks, the maximum fill level can easily be altered from one tank to the other simply by fixing a different shaped cover to the reliefs.

The invention also relates to a method of manufacturing a tank for storing a liquid.

According to the invention, this method comprises the following steps:

a) supplying a first half of a tank comprising a wall made of plastic and comprising a first part of a device for stopping the filling of the tank with a liquid at a maximum fill level, the first part being formed with the wall, b) fixing a second part hermetically to the first part, this second part forming, with the first part, the fill-stop device, the fill-stop device comprising at least one opening of which the position within the tank fixes this maximum fill level, c) fixing a second half of the tank to the first half of the tank so as to form this tank, the fill-stop device extending inside the tank.

The invention will be clearly understood and the advantages thereof will become better apparent from reading the following detailed description of one nonlimiting embodiment. The description refers to the attached drawings in which.

Figure 1:
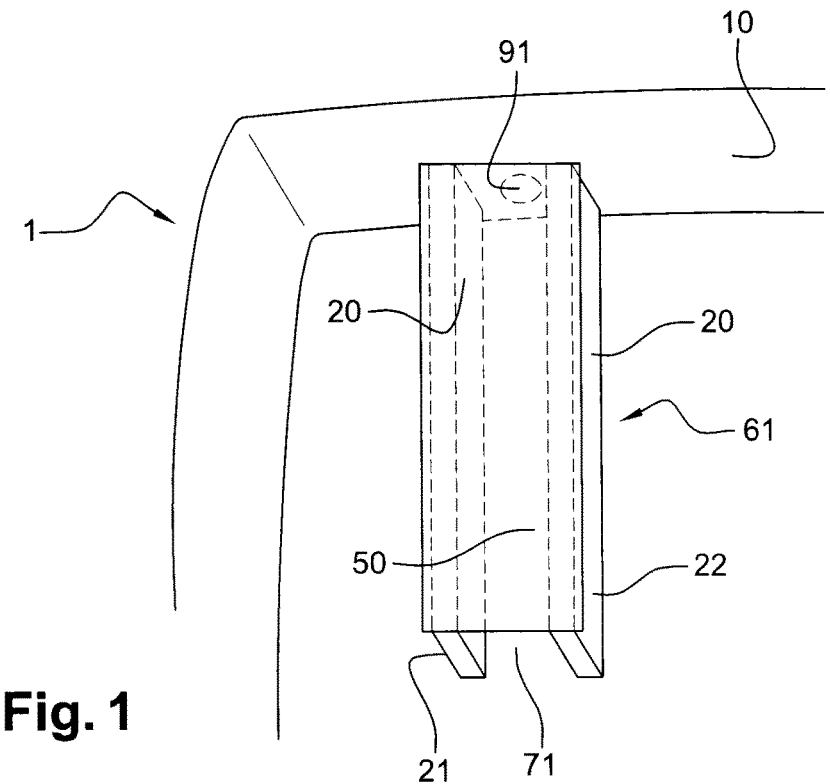
FIG. 1 is a perspective view of a tank according to the invention.

The tank 1 according to the invention comprises a wall 10 made of plastic and the wall 10 has a first port 91 which opens to the outside of the tank.

This first port 91 is produced directly in the wall 10, for example by drilling. Alternatively, this first port 91 is located in an element (for example an end piece or a ring) which is housed in a hole in the wall 10, the annular space in said element constituting this first port 91.

Thus, in all instances, the wall 1 has a first port 91 via which the fill-stop device communicates with the outside of the tank 1.

Reliefs 20 extend from the vicinity of the first port 91.

These reliefs 20 are situated on the internal face of the tank 1. In the present description, the terms "internal" and "inside" qualify the space situated within the tank 1, and the terms "external" and "outside" qualify the space outside the tank 1.

In the present description, when an element (the first part, the reliefs) is described as being formed with the wall, that means that this element and the wall are manufactured simultaneously in one same process, so that this element forms a single piece with the wall. "A single piece" means a one-piece component.

This process is, for example, the injection moulding of a resin.

As depicted in FIG. 1, the reliefs 20 are formed by ribs (21, 22) extending transversely inside the tank 1. A first rib 21 and a second rib 22 are situated one on each side of the first port 91 and extend in a longitudinal direction along the wall 10 of the tank.

The longitudinal direction is substantially rectilinear, as depicted in FIG. 1 and, for example, vertical when the tank is in the normal position of use. Alternatively, it may be curved, namely the longitudinal direction varies along the first canal 61 defined herein below. The longitudinal direction extends from the first port 91 as far as the opening 71 of the first canal 61.

A cover 50 is fixed to the edges of these ribs (21, 22) to form a first canal 61. Fixing is, for example, by welding.

The cover 50 extends from the level of the first port 91 in the longitudinal direction over at least part of these ribs (21, 22).

For example, the cover 50 extends over the entire length of these ribs (21, 22), as depicted in FIG. 1.

Alternatively, the ribs (21, 22) are configured to meet laterally in the vicinity of the first port 91, so as to form a tube closed at the side and extending from the first port 91 over a certain length. Beyond this tube, the cover 50 is fixed to the ribs (21, 22) so as to close on the side the space comprised between these ribs (21, 22) and form the first canal 61.

Thus, according to the invention, the lateral wall of the first canal 61 is hermetically sealed.

Over the part of the first canal 61 that bears the cover 50, the ribs (21, 22) form just part of the lateral wall of the canal in a given cross section (namely a cross section perpendicular to the longitudinal direction), the remainder of the lateral wall of the first canal 61 being formed by the cover 50.

A certain distance away from the first port 91, the first canal 61 has an opening 71 which opens to the inside of the tank and through which a gas can flow.

In all instances, the end of the first canal 61 at the level of the first orifice 91 opens only onto this first orifice 91.

Thus, the first canal 61 is a canal for ventilating the tank 1, such that the position of the opening 71 fixes the maximum fill level of the tank. What happens is that the tank 1 has a second port 92 causing the inside and the outside of the tank 1 to communicate and via which a liquid can pass in order to fill this tank 1. Given that the first canal 61 is hermetically sealed between the first port 91 and the opening 71, when the liquid passing through the second port 92 reaches the opening 71, the liquid can no longer rise any further in the tank 1.

Advantageously, the opening 71 is at least partially formed by the cover 50. Thus, the geometry of the cover 50 determines the position of the opening, and therefore the maximum fill level of the tank.

Advantageously, the cover 50 comprises a through-orifice forming the opening 71. The opening 71 therefore passes only through the cover 50.

Thus, in the case of two tanks which need to differ only in terms of their maximum fill level, this level can easily be modified from one tank to the other simply by fixing to the reliefs 20 a cover 50 in which only the position of the opening 71 has been modified. There is no need to modify the rest of the tanks.

Alternatively, the opening 71 is formed by the cover 50 and by the reliefs 20. Thus, part of the edge of the opening 71 is formed by the cover 50, and the other part of the edge of the opening 71 is formed by the reliefs 20. The edge of the opening 71 is the periphery of this opening.

Alternatively, the opening 71 is formed by the cover 50, by the reliefs 20 and by the wall 10. This situation is illustrated in FIG. 1.

Figure 2:
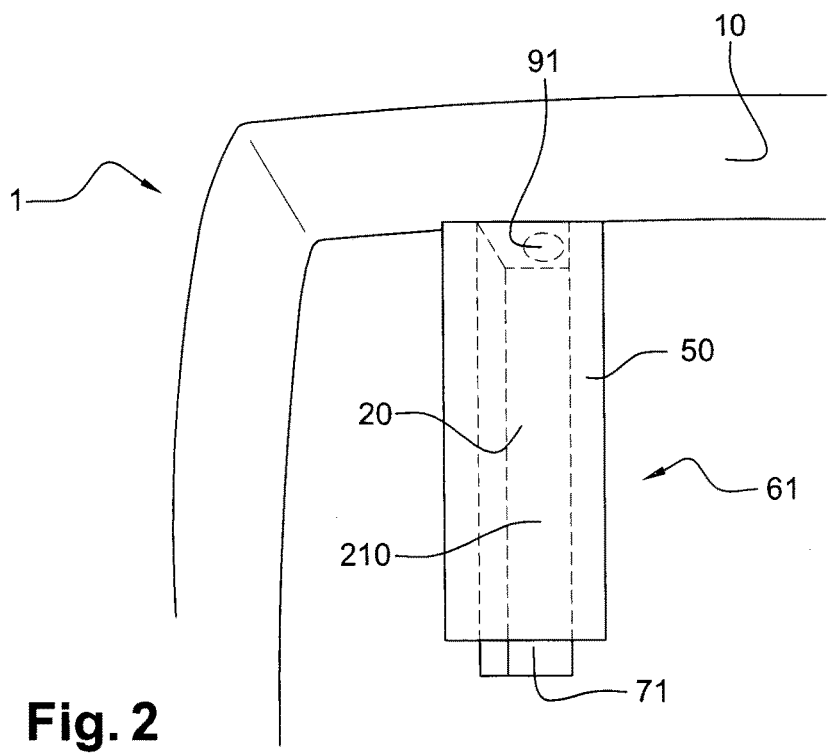
FIG. 2 is a perspective view of a tank according to another embodiment of the invention.

FIG. 2 illustrates another embodiment of the invention, in which the reliefs 20 are formed by a groove 210, and the cover 50 is fixed to the groove 210. The groove 210 forms a depression on the internal face of the wall 10 of the tank.

The cover 50 is fixed to the edges of the groove 210 in such a way as to form a first canal 61, as depicted in FIG. 2. Alternatively, the cover 50 is fixed to the bottom and/or walls of the groove 210.

The first port 91 is situated in the groove 210 which runs in a longitudinal direction along the wall 10 of the tank.

The longitudinal direction is substantially rectilinear, as depicted in FIG. 2. Alternatively, it may be curved.

The cover 50 extends from the level of the first port 91 in the longitudinal direction over at least part of the groove 210.

For example, the cover 50 extends over the entire length of the groove 210, as depicted in FIG. 2.

The lateral wall of the first canal 61 is hermetically sealed.

Over the part of the first canal 61 that bears the cover 50, the groove 210 forms just part of the lateral wall of the canal in a given cross section, the rest of the lateral wall of the first canal 61 being formed by the cover 50.

A certain distance away from the first port 91, the first canal 61 has an opening 71 which opens to the inside of the tank and through which a gas can flow.

In all instances, the end of the first canal 61 at the level of the first port 91 opens only onto this first port 91.

Thus, the first canal 61 is a canal for ventilating the tank 1, such that the position of the opening 71 fixes the maximum fill level of the tank.

The first canal 61 therefore forms the device that stops the filling of the tank 1.

The above description regarding the opening 71 in the case where the reliefs 20 are ribs applies analogously to an instance in which the reliefs 20 are a groove.

In the embodiments depicted in FIG. 1 and FIG. 2, the cover 50 is a plate.

A plate means a planar element, namely an element extending only (or essentially) in one plane.

This then makes the cover 50 easier to manufacture.

Alternatively, the cover 50 is a shell, namely an element curved in space and of which two of the spatial dimensions are large in comparison with the third.

According to one embodiment of the invention, the tank has a filling device (for filling this tank), which is for example a canal.

Thus, the reservoir has a second canal 62 for the circulation of liquid between the inside and the outside of the tank 1, this second canal 62 being formed by part of the reliefs 20 extending along this second canal 62 and by part of the cover 50 which is fixed hermetically to the reliefs 20.

The second canal 62 has an opening 72 which opens to the inside of the tank 1 and through which a liquid is able to flow. Thus, the liquid flows from the second canal 62 into the tank 1 through this opening 72.

Figure 3:
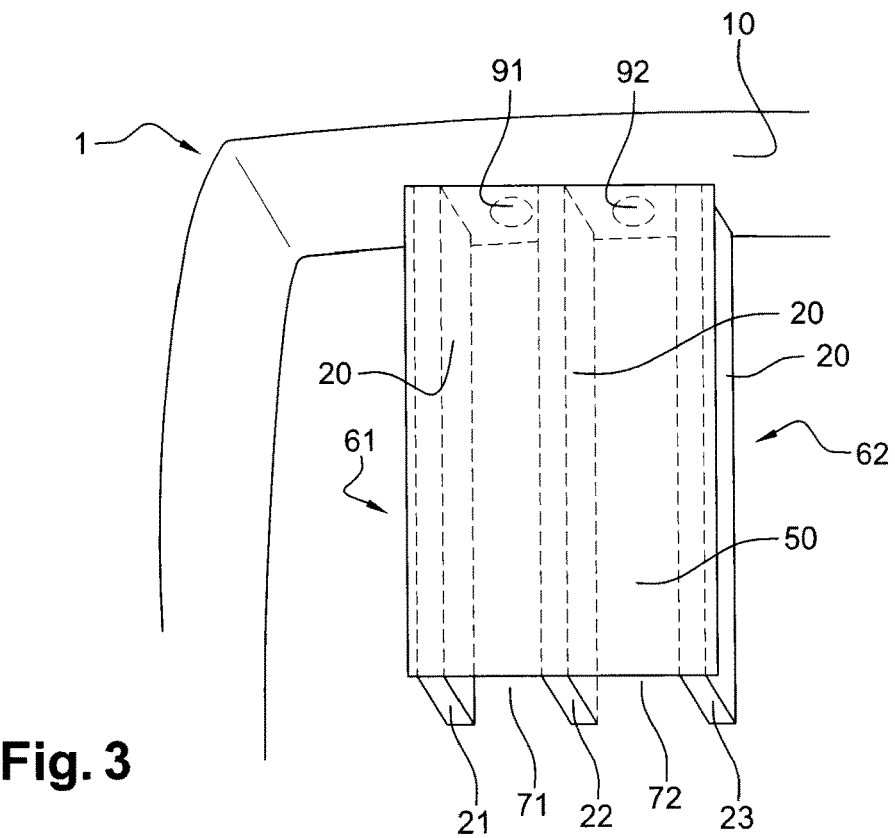
FIG. 3 is a perspective view of a tank according to yet another embodiment of the invention.

Such a tank is depicted in FIG. 3.

For example, this second canal 62 is the canal, also referred to as a duct, for the filling of the tank 1 through which canal or duct liquid enters the tank 1. The liquid enters the tank via the second orifice 92 mentioned hereinabove. The second orifice 92 is therefore situated in the second canal 62, for example at one end of this second canal 62.

In FIG. 3, the reliefs on the wall 10 consist of three ribs (21, 22, 23) which run substantially in the same longitudinal direction, the cover 50 being fixed to these three ribs in such a way as to form the first canal 61, which is the ventilation canal, with the first rib 21 and the second rib 22 and to form the second canal 62, which is the filling canal, with the second rib 22 and the third rib 23.

Alternatively, the reliefs on the wall 10 consist of two grooves which run substantially in the same longitudinal direction, the cover 50 being fixed to these two grooves in such a way as to form the first canal 61, which is the ventilation canal, with the first groove and to form the second canal 62, which is the filling canal, with the second groove.

According to the invention, when the tank 1 is in the normal position of use, the opening 71 of the first ventilation canal 61 is situated below (with reference to the vertical) the first ventilation port 91 so that as the liquid level rises and reaches this opening 71 it cannot enter that part of the first canal 61 which extends between this opening 71 and the first orifice 91.

It is advantageous for the opening 72 of the second, filling, canal 62 to be situated below the opening 71 of the first canal 61 so that as the tank 1 is being filled, ventilation occurs preferentially via this first canal 61.

Advantageously, as in the above embodiments, over that portion of the first canal 61 and/or of the second canal 62 that bears the cover 50, the reliefs 20 form part of the lateral wall of the canal in each cross section, the remainder of the lateral wall of the canal being formed by the cover 50. A cross section is a section perpendicular to the longitudinal direction of the canal.

Thus, it is easier to fix the cover 50 to the reliefs 20.

In general, over that portion of the first part that bears the second part, this first part forms part of the lateral wall of the fill-stop device in each cross section, the remainder of the lateral wall of the fill-stop device being formed by the second part.

In general, a device for filling the tank is formed in part by part of the reliefs 20 and in part by the cover 50 which is fixed hermetically to the reliefs 20, this filling device having an opening 72 which opens to the inside of the tank and through which a liquid is able to flow.

In the above description, the term "portion" is defined with reference to the longitudinal direction of the canal. Thus, "portion of the canal" means a portion of the canal between one cross section and another cross section which are both perpendicular to the longitudinal direction.

According to another embodiment of the invention, the reliefs 20 of the first canal 61 consist of the edge of this first port 91. This edge may have the form of a nozzle 215 extending into the tank. In this case, the cover 50 is a tube 51 which prolongs these reliefs 20. The tube 51 is thus fixed, for example by welding, to the edge of this nozzle 215 so as to extend this nozzle 215. The nozzle 215 and the tube 51 are thus welded edge to edge, the edge of one longitudinal end of the tube 51 being welded to the edge of the nozzle 215. The other longitudinal end of the tube 51 then constitutes the opening 71 of the first canal 61, this first canal 61 consisting of the nozzle 215 and of the tube 51.

By altering the length of the tube 51, the height to which the tank is filled is modified.

Figure 4:
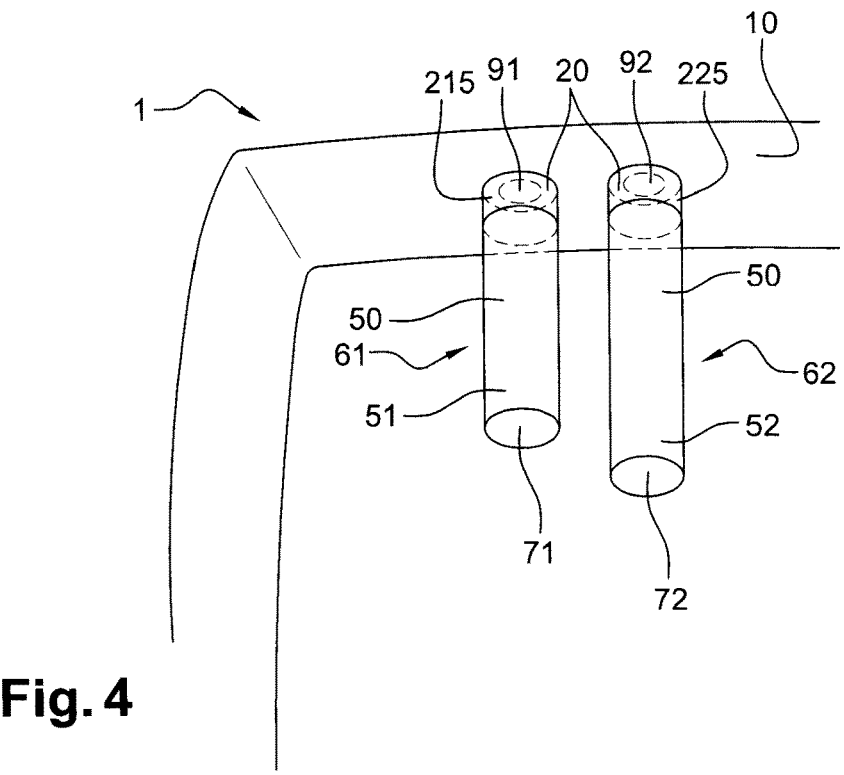
FIG. 4 is a perspective view of a tank according to yet another embodiment of the invention.

This embodiment is depicted in FIG. 4.

As an alternative, each canal according to the invention is configured similarly. Thus, as depicted in FIG. 4, the reliefs 20 of the second canal 62 consist of the edge of this second port 92. This edge may have the form of a nozzle 225 extending inside the tank. In that case, the part of the cover 50 for this second canal 62 is a tube 52 prolonging these reliefs 20. The tube 50 is thus fixed, for example by welding, to the edge of this nozzle 225 so as to prolong this nozzle 225. The nozzle 225 and the tube 52 are thus welded edge to edge, the edge of one longitudinal end of the tube 52 being welded to the edge of the nozzle 225. The other longitudinal end of the tube 52 therefore constitutes the opening 72 of the second canal 62, this second canal 62 consisting of the nozzle 225 and of the tube 52.

In the above description, the cover 50 may be of a single piece or in a number of separate bits.

The invention also relates to a method of manufacturing a tank 1 for the storage of a liquid, whereby a first half of a tank 1 comprising a wall 10 made of plastic and comprising a first part of a device for stopping the filling of the tank 1 with a liquid at a maximum fill level is supplied, the first part being formed with the wall 10 (step (a)). Next, a second part is hermetically fixed to the first part, this second part forming with the first part the fill-stop device, the fill-stop device comprising at least one opening 71 of which the position inside the tank fixes this maximum fill level (step (b)). Next, a second half of the tank 1 is fixed to the first half of the tank 1 so as to form this tank 1, the fill-stop device extending inside the tank 1 (step (c)).

All the embodiments and alternative forms of embodiment of the tank 1 according to the invention which have been described hereinabove apply to the method according to the invention.

The invention claimed is:

1. A tank for storing a liquid, comprising a wall made of plastic and a fill-stop device for stopping the filling of said tank with a liquid at a maximum fill level, said tank comprising a port to communicate with the outside of the tank, said fill-stop device extending inside the tank and comprising at least one opening located inside the tank and a ventilation canal extending between the port and the opening, wherein a position of the opening inside said tank fixes said maximum fill level wherein said fill-stop device stops tank filling when the liquid reaches the opening which is positioned inside the tank, said fill-stop device comprising a first part formed with said wall and a second part which is fixed hermetically to said first part and wherein said first part comprises reliefs moulded on an internal face of said wall, and wherein said second pan comprises a cover which is fixed hermetically to said reliefs.

2. The tank according to claim 1, wherein said opening is formed by said cover and by said reliefs.

3. The tank according to claim 1, wherein said cover comprises a through-orifice forming said opening.

4. The tank according to claim 1, wherein a portion of said first part that bears said second part, said first part forms part of a lateral wall of said fill-stop device in each cross section perpendicular to a longitudinal direction in which said fill-stop device extends, a rest of said lateral wall being formed by said second part.

5. The tank according to claim 1, wherein said wall has a first port via which said fill-stop device communicates with the outside of said tank.

6. The tank according to claim 1, wherein said reliefs are formed by ribs extending transversely towards the inside of said tank, said cover being fixed to the edges of said ribs.

7. The tank according to claim 1, wherein said reliefs are formed by a groove, said cover being fixed over said groove.

8. The tank according to claim 1, wherein said cover is a plate.

9. The tank according to claim 1, comprising a device for the filling said tank with a liquid, said filling device being formed in part by part of said reliefs and in part by said cover which is fixed hermetically to said reliefs, said filling device having an opening which opens to the inside of the tank and through which a liquid is able to flow.

10. A method of manufacturing a tank for storing a liquid, this method comprising the following steps:
   a) supplying a first half of a tank comprising a wall made of plastic and comprising a first part of a device for stopping the filling of said tank with a liquid at a maximum fill level, said first part being formed with said wall,
   b) fixing a second part hermetically to said first part, said second part forming, with said first part, said fill-stop device, said fill-stop device comprising at least one opening located inside the tank and a ventilation canal extending between the opening and a port allowing a communication without the outside of the tank, wherein the position of the opening within said tank fixes said maximum fill level wherein said fill-stop device stops tank filling when the liquid reaches the opening which is positioned inside the tank, wherein said first part comprises reliefs moulded on an internal face of said wall, and wherein said second part comprises a cover which is fixed hermetically to said reliefs,
   c) fixing a second half of said tank to said first half of the tank so as to form this tank, said fill-stop device extending inside said tank.

11. The method according to claim 10, wherein said fill-stop device is a ventilation duct.

12. The method according to claim 10, wherein said fill-stop device allows a fill stop when the liquid reaches the opening inside the tank.

13. The method according to claim 10, wherein said first part and said second part form a hermetic duct opened at its two endpoints, wherein a first endpoint is in contact with the wall in front of an opening made into said wall and a second endpoint forms the opening inside the tank.

14. The method according to claim 1, wherein said fill-stop device is a ventilation duct.

15. The tank according to claim 1, wherein said first part and said second part form a hermetic duct opened at its two endpoints, wherein a first endpoint is in contact with the wall in front of an opening made into said wall and a second endpoint forms the opening inside the tank.

16. The method according to claim 10, wherein said opening is formed by said cover and by said reliefs.

* * * * *